No. 677,799. Patented July 2, 1901.
M. T. ROBINSON.
CLOSET SEAT.
(Application filed Oct. 6, 1900.)
(No Model.)
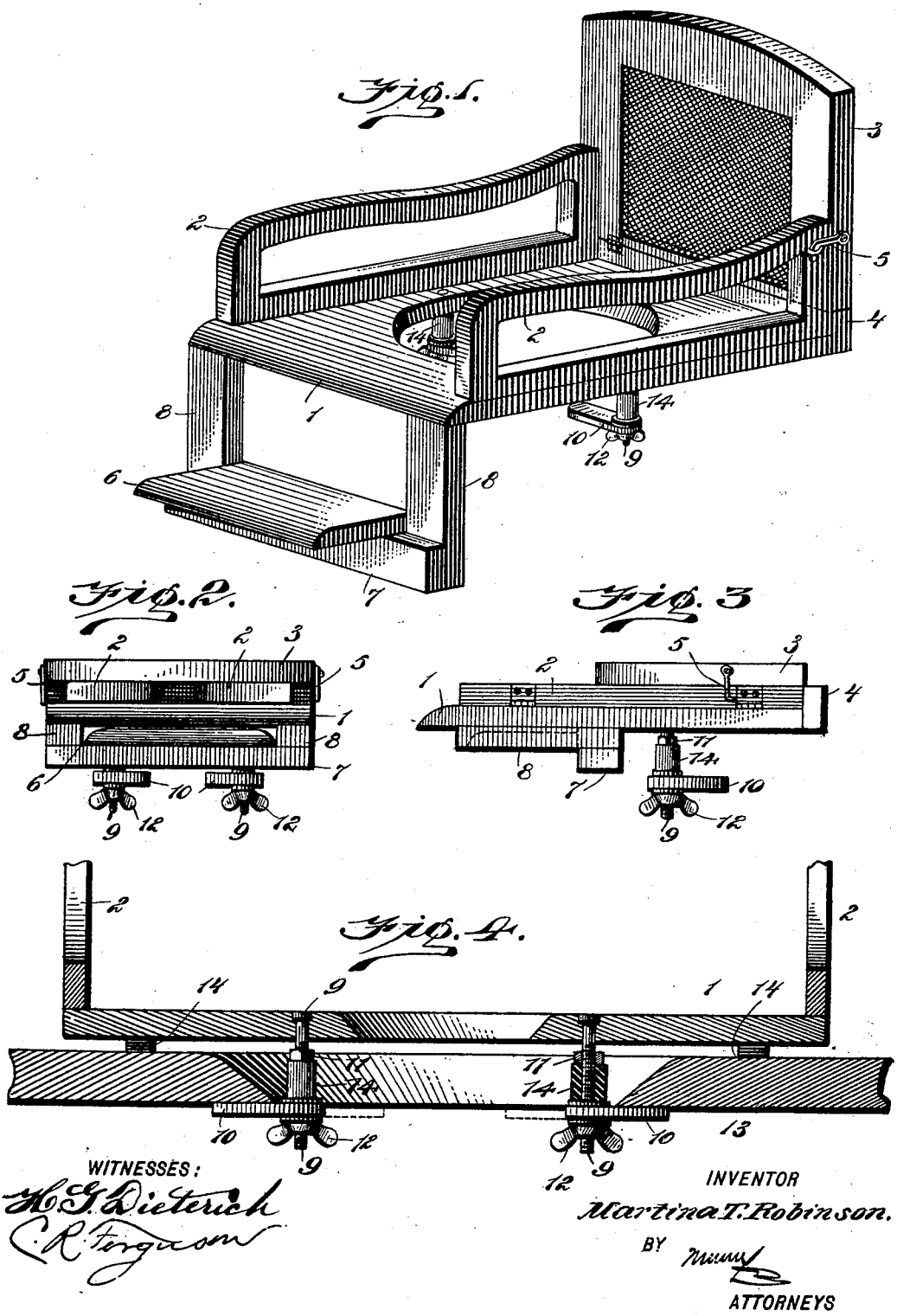
WITNESSES:
H. T. Dieterich
C. R. Ferguson
INVENTOR
Martina T. Robinson.
BY
ATTORNEYS

UNITED STATES PATENT OFFICE.

MARTINA TALMAGE ROBINSON, OF BLOOMSBURG, PENNSYLVANIA.

CLOSET-SEAT.

SPECIFICATION forming part of Letters Patent No. 677,799, dated July 2, 1901.

Application filed October 6, 1900. Serial No. 32,225. (No model.)

*To all whom it may concern:*

Be it known that I, MARTINA TALMAGE ROBINSON, a citizen of the United States, and a resident of Bloomsburg, in the county of Columbia and State of Pennsylvania, have invented a new and Improved Closet-Seat, of which the following is a full, clear, and exact description.

This invention relates to improvements in water-closet seats; and one object is to provide a seat of simple and comparatively inexpensive construction adapted for the use of children and so arranged that it may be compactly folded, and thus it may be conveniently carried when traveling or packed away when not in use; and a further object is to provide the seat with means whereby it may be securely fastened to an ordinary closet-seat without injury thereto.

I will describe a closet-seat embodying my invention and then point out the novel features in the appended claims.

Reference is to be had to the accompanying drawings, forming a part of this specification, in which similar characters of reference indicate corresponding parts in all the figures.

Figure 1 is a perspective view of a closet-seat embodying my invention. Fig. 2 is a front view showing the seat as folded. Fig. 3 is a side view of the folded seat, and Fig. 4 is a sectional view showing the seat as secured to a stationary closet-seat.

Referring to the drawings, 1 designates the seat, having the usual opening, and to the opposite sides of which seat the arms 2 are hinged in such manner as to fold down on the seat. A back 3 is hinged at the rear of the seat, and to permit the back to fold closely against the folded arms the said back has a hinge connection with an upwardly-extending rail 4, secured to the rear of the seat. When the back and arms are in open position, they may be secured by any suitable means. I have here shown hooks 5 for this purpose.

A foot-rest or step 6 has hinge connection with a cross-bar 7, attached to hangers 8, hinged to and adapted to fold against the under side of the seat.

I employ means for rigidly securing the portable seat to a fixed closet-seat. This means consists of threaded bolts 9, extended downward from the seat 1, and movable on these bolts and extending at right angles therefrom are clamping-plates 10, designed to engage against the under surface of the fixed or large seat, as indicated in Fig. 3. Jam-nuts 11 are arranged on the bolts above the clamping-plates, and thumb-nuts 12 on the bolts engage against the under sides of the plates. Obviously by adjusting the nuts the seat 1 may be firmly clamped to a fixed seat 13.

To prevent injury or scratching of the fixed seat, I attach a cushion 14, of rubber or the like, to the under side of the portable seat, and to prevent possible scratching of the edge of the opening in the fixed seat hard-rubber sleeves 14 may be placed on the bolts.

Having thus described my invention, I claim as new and desire to secure by Letters Patent—

1. A closet-seat, comprising a seat portion, arms having hinge connection with the seat, a back having hinge connection with the seat, hangers hinged to the seat, and a hinged foot-rest supported by the hangers, substantially as specified.

2. A portable seat for a closet and fastening devices for securing the portable seat to a fixed seat, the said fastening devices passing through the opening of the fixed seat and engaging with the under side thereof, substantially as specified.

3. A portable seat for a closet, bolts extended downward from the seat, clamping-plates adjustable on said bolts, and securing-nuts on the bolts, substantially as specified.

In testimony whereof I have signed my name to this specification in the presence of two subscribing witnesses.

MARTINA TALMAGE ROBINSON.

Witnesses:
S. F. PEACOCK,
J. J. ROBINSON.